(12) United States Patent
King

(10) Patent No.: US 6,485,045 B1
(45) Date of Patent: Nov. 26, 2002

(54) COMBINATION FIFTH WHEEL AND GOOSENECK HITCH

(75) Inventor: Robert H. King, Martin, TN (US)

(73) Assignee: Tennessee Truck Works, L.L.C., Dresden, TN (US)

( * ) Notice: Subject to any disclaimer, the term of this patent is extended or adjusted under 35 U.S.C. 154(b) by 0 days.

(21) Appl. No.: 09/912,035

(22) Filed: Jul. 24, 2001

(51) Int. Cl.$^7$ .............................. B62D 1/07; B62D 1/44
(52) U.S. Cl. .................... 280/417.1; 280/441; 280/901; 280/511
(58) Field of Search ........................... 280/416.1, 417.1, 280/433, 438.1, 439, 440, 441, 441.2, 901, 504, 511

(56) References Cited

U.S. PATENT DOCUMENTS

| | | | |
|---|---|---|---|
| 3,790,188 A | 2/1974 | Johannes | 280/423 |
| 4,183,548 A | 1/1980 | Schneckloth | 280/433 |
| 4,546,994 A | 10/1985 | Taylor | 280/423 |
| 4,883,285 A | 11/1989 | Hohrman | 280/491.5 |
| 5,013,060 A * | 5/1991 | Van Andel et al. | 280/423.1 |
| 5,328,198 A * | 7/1994 | Adams | 267/35 |
| 5,344,172 A | 9/1994 | Jaun | 280/415.1 |
| 5,772,229 A | 6/1998 | Cattau | 280/438.1 |
| 5,788,257 A | 8/1998 | Meyerhofer | 280/416.1 |
| 6,135,482 A * | 10/2000 | Larkin | 280/416.1 |
| 6,213,492 B1 * | 4/2001 | Ceccarelli, III | 280/416.1 |

* cited by examiner

Primary Examiner—Kevin Hurley
(74) Attorney, Agent, or Firm—Walker, McKenzie & Walker

(57) ABSTRACT

A combination hitch for allowing a towed vehicle to be fastened to a tow vehicle. The combination hitch includes a base for being attached to the bed of the tow vehicle, the base including a ball hitch member located substantially over the centerline of the rear axle of the tow vehicle. The combination hitch also includes a superstructure movable between a first position attached to the base and second position attached to the base. The superstructure has a pin box hitch member located substantially directly over the ball hitch member and the centerline of the rear axle of the tow vehicle when the superstructure is in the first position and not located substantially directly over the ball hitch member and the centerline of the rear axle of the tow vehicle when the superstructure is in the second position.

8 Claims, 7 Drawing Sheets

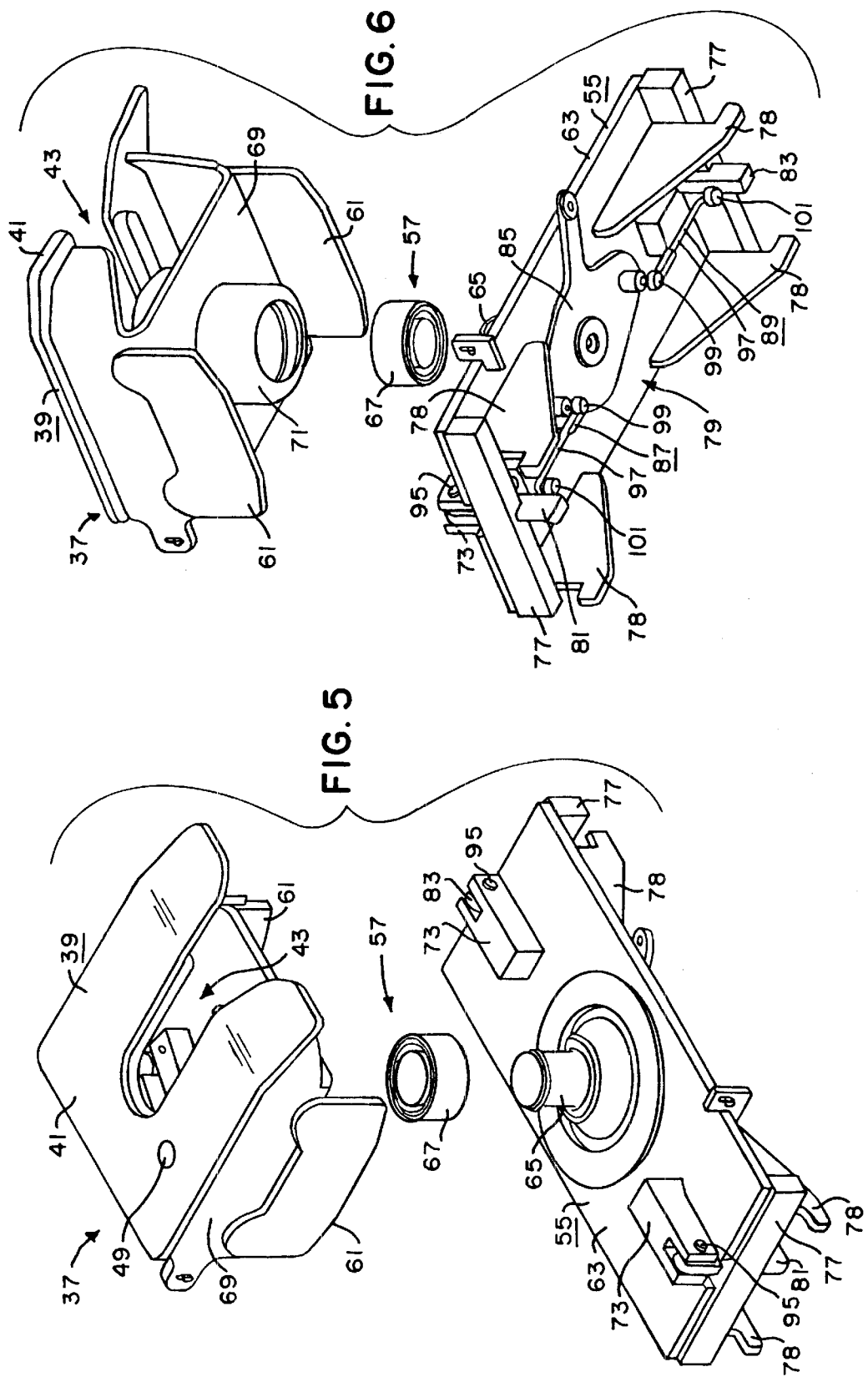

COMBINATION FIFTH WHEEL AND GOOSENECK HITCH

BACKGROUND OF THE INVENTION

1. Field of the Invention

The present invention relates, in general, to trailer hitch apparatuses, and in particular, to a combined trailer hitch apparatus attachable to a tow vehicle for alternately towing gooseneck and fifth wheel trailers.

2. Information Disclosure Statement

It is often desired to use a single tow vehicle (e.g., a pickup truck or the like) to tow a gooseneck trailer and, alternately, a fifth wheel trailer. Both fifth wheel trailers and gooseneck trailers are commonly towed by trucks having substantially flat beds (e.g., a conventional pickup truck) and are conventionally mounted or "hitched" to the tow vehicle substantially between the rear wheels and over the rear axle of the tow vehicle. The front of a fifth wheel trailer is normally constructed so as to extend over the rear bed of a tow vehicle and includes a kingpin depending from the bottom thereof for engaging a fifth wheel hitch mechanism mounted to the bed of the tow vehicle substantially between the rear wheels and over the rear axle of the tow vehicle. The front of a gooseneck trailer is normally constructed with a curved neck for extending over the rear bed of a tow vehicle with the neck terminating in a receiver for receiving a hitch ball of a ball-type hitch mechanism mounted to the bed of the tow vehicle substantially between the rear wheels and over the rear axle of the tow vehicle.

A preliminary patentability search in Class 280, subclasses 415.1, 416.1, 416.3, 417.1 and 901, produced the following patents, which appear to be relevant to the present invention: Meyerhofer, U.S. Pat. No. 5,788,257, issued Aug. 4, 1998; Cattau, U.S. Pat. No. 5,772,229, issued Jun. 30, 1998; Putnam, U.S. Pat. No. 5,513,869, issued May 7, 1996; Jaun, U.S. Pat. No. 5,344,172, issued Sep. 6, 1994; Hohrman, U.S. Pat. No. 4,883,285, issued Nov. 28, 1989; Taylor, U.S. Pat. 4,546,994, issued Oct. 15, 1985; Schneckloth, U.S. Pat. No. 4,183,548, issued Jan. 15, 1980; and Johannes, U.S. Pat. No. 3,790,188, issued Feb. 5, 1974.

Nothing in the known prior art, either singly or in combination, disclose or suggest the present invention. More specifically, nothing in the known prior art discloses or suggests a combination hitch including a base for being attached to the bed of a tow vehicle, the base including a ball hitch member located substantially over the centerline of the rear axle of the tow vehicle; and a superstructure movable from a first position attached to the base to a second position attached to the base, the superstructure having a pin box hitch member located substantially directly over the ball hitch member and the centerline of the rear axle of the tow vehicle when the superstructure is in the first position and not located substantially directly over the ball hitch member and the centerline of the rear axle of the tow vehicle when the superstructure is in the second position.

BRIEF SUMMARY OF THE INVENTION

The present invention provides a hitch for allowing a towed vehicle (e.g., a fifth wheel or gooseneck trailer or the like) to be fastened to a tow vehicle (e.g., a pick up truck or the like). A basic concept of the present invention is to provide a combination hitch that allows quick and easy conversion between a fifth wheel hitch and a gooseneck hitch, etc., without requiring tools of any type.

The combination hitch of the present invention comprises, in general, a base for being attached to the bed of a tow vehicle, the base including a ball hitch member located substantially over the centerline of the rear axle of the tow vehicle; and a superstructure movable from a first position attached to the base to a second position attached to the base, the superstructure having a pin box hitch member located substantially directly over the ball hitch member and the centerline of the rear axle of the tow vehicle when the superstructure is in the first position and not located substantially directly over the ball hitch member and the centerline of the rear axle of the tow vehicle when the superstructure is in the second position.

It is an object of the present invention to provide a combination hitch that allows the same tow vehicle to be utilized for fifth wheel trailer and gooseneck trailer towing, etc., without being cumbersome or time consuming.

Another object of the present invention is to provide a combination hitch having a superstructure that merely slides forward of the centerline of the rear axle of the tow vehicle (towards the front of the tow vehicle) to expose a ball hitch member for optimum towing.

Another object of the present invention is to provide a combination hitch having superstructure that merely slides over the centerline of the rear axle of the tow vehicle to position a pin box hitch member for optimum towing.

Another object of the present invention is to provide a combination hitch having superstructure that merely slides rearward of the centerline of the rear axle of the tow vehicle (toward the rear of the tow vehicle) to position a pin box hitch member for optimum or enhanced towing without damaging the tow vehicle or towed vehicle.

Another object of the present invention is to provide a combination hitch that can be very quickly and efficiently repositioned by pulling a single handle to unlock the superstructure from the base, requiring no tools and no hardware removal.

Another object of the present invention is to provide a combination hitch having a pin box that tilts fore and aft and side to side, and also swivels a limited amount about an axis to allow compensation for misalignment between tow vehicle and towed vehicle during fastening of the towed vehicle to the combination hitch (i.e., during hook-up).

Another object of the present invention is to provide such a combination hitch that will work with a fastening system such as the mounting apparatus disclosed in King, U.S. Pat. No. 6,158,761, issued Dec. 12, 2000, so that no modification (e.g., holes cut, burned or drilled) is required to the bed of the tow vehicle, etc.

BRIEF DESCRIPTION OF THE SEVERAL VIEWS OF THE DRAWINGS

FIG. 5 is a top left exploded perspective view of the superstructure of the combination hitch of the present invention, with parts thereof removed for clarity.

FIG. 6 is a bottom left exploded perspective view of the superstructure of the combination hitch of the present invention, with parts thereof removed for clarity.

DETAILED DESCRIPTION OF THE INVENTION

Figure 1:
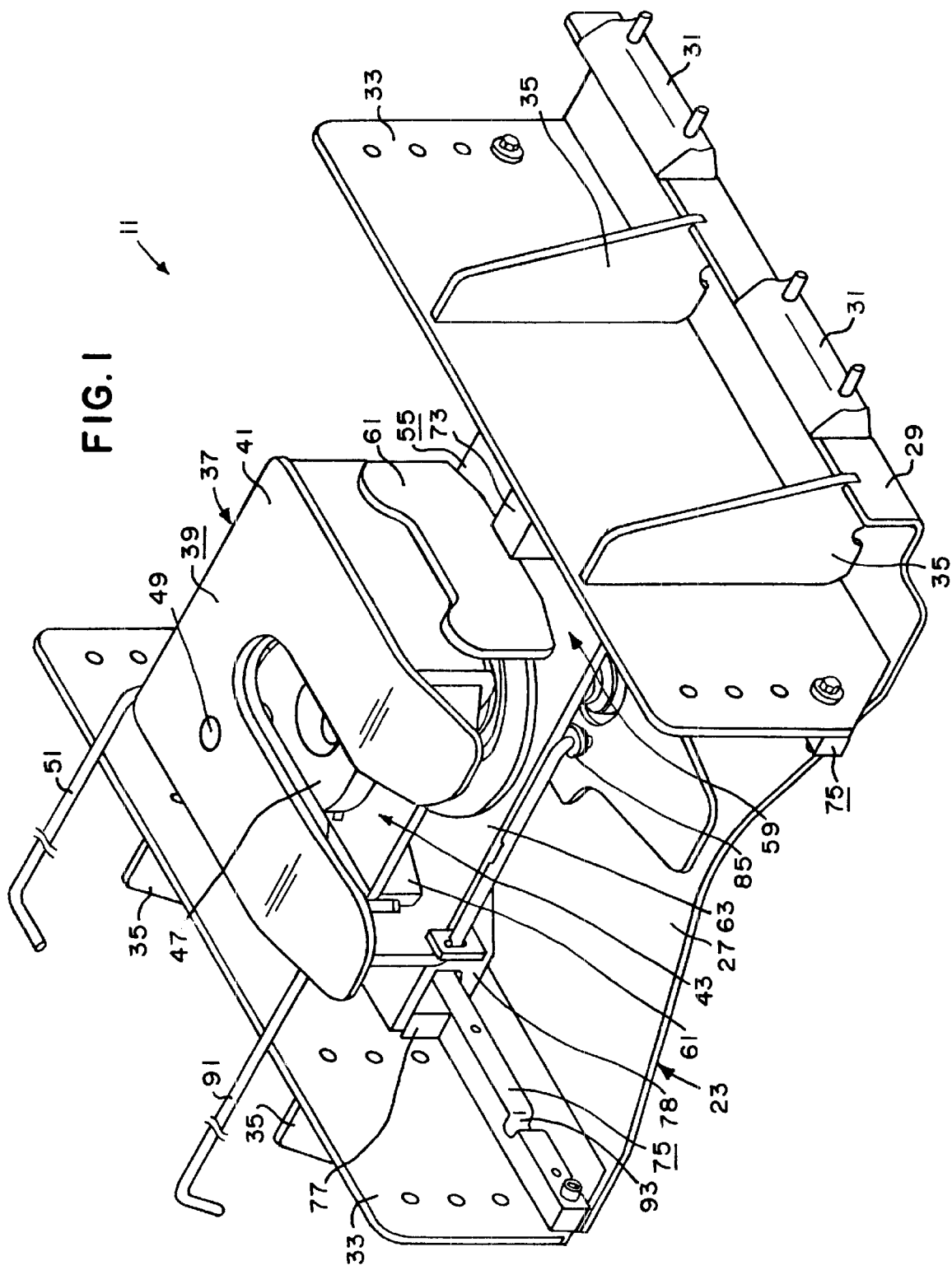
FIG. 1 is a perspective view of the combination hitch of the present invention with the superstructure thereof shown in a first position to allow towing of a fifth wheel if towed vehicle.
Figure 2:
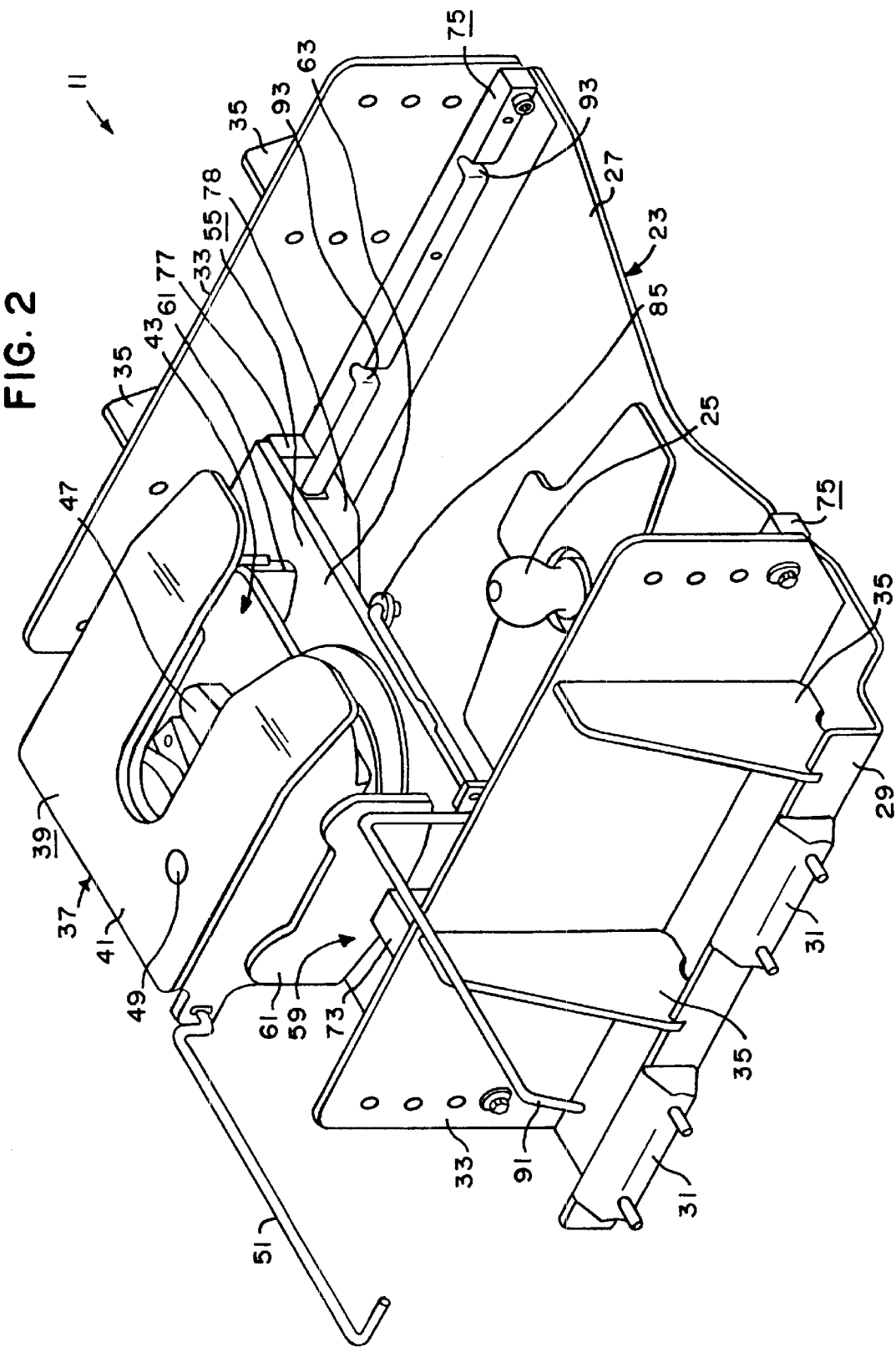
FIG. 2 is a perspective view of the combination hitch of the present invention with the superstructure thereof shown in a second position to allow towing of a gooseneck towed vehicle.

A preferred embodiment of the combination hitch of the present invention is shown in FIGS. 1–11 and identified by the numeral 11. The hitch mechanism 11 is designed to allow a towed vehicle 13 (e.g., a fifth wheel towed vehicle or trailer 13FW or a gooseneck towed vehicle or trailer 13GN) to be fastened to a tow vehicle 15 (such as a pick up truck) having a bed 17 and a rear axle 19 with a centerline 21 transversing the bed 17.

The combination hitch 11 includes a base 23 for being attached to the bed 17 of the tow vehicle 15. The base 23 includes a ball hitch member 25 for being located substantially over the centerline 21 of the rear axle 19 of the tow vehicle 15 when the combination hitch 11 is attached to the bed 17 of the tow vehicle 15. The ball hitch member 25, sometimes referred to as a gooseneck ball, is the well know design used for hitching gooseneck trailers 13GN and the like to tow vehicles. The base 25 preferably includes a substantially flat base plate 27 to which the ball hitch member 25 is fixedly attached by welding or the like.

The combination hitch 11 of the present invention is especially adapted for use with a rail system such as the mounting apparatus disclosed in King, U.S. Pat. No. 6,158,761, issued Dec. 12, 2000, incorporated herein by reference, so that no modification (e.g., holes cut, burned or drilled) is required to the bed 17 of the tow vehicle 15, etc. For example, the base plate 27 may have opposite upturned side edges 29 to which clamp bars 31 are attached, the clamp bars 31 being part of or designed for use with the rail system of a mounting apparatus such as disclosed in King, U.S. Pat. No. 6,158,761, with portions of the rails and associated mechanisms being shown in FIG. 4.

The actual construction of the base 23, including the ball hitch member 25 and base plate 27, may vary as will now be apparent to those skilled in the art. The base 23 preferably includes side plates 33 attached adjacent each side edge 29 of the base plate 27. Ribs or trusses 35 may be proved between the outer wall of each side plate 33 and the base plate 27 to reinforce the structure formed between the base plate 27 and side plates 33, etc.

Figure 3:
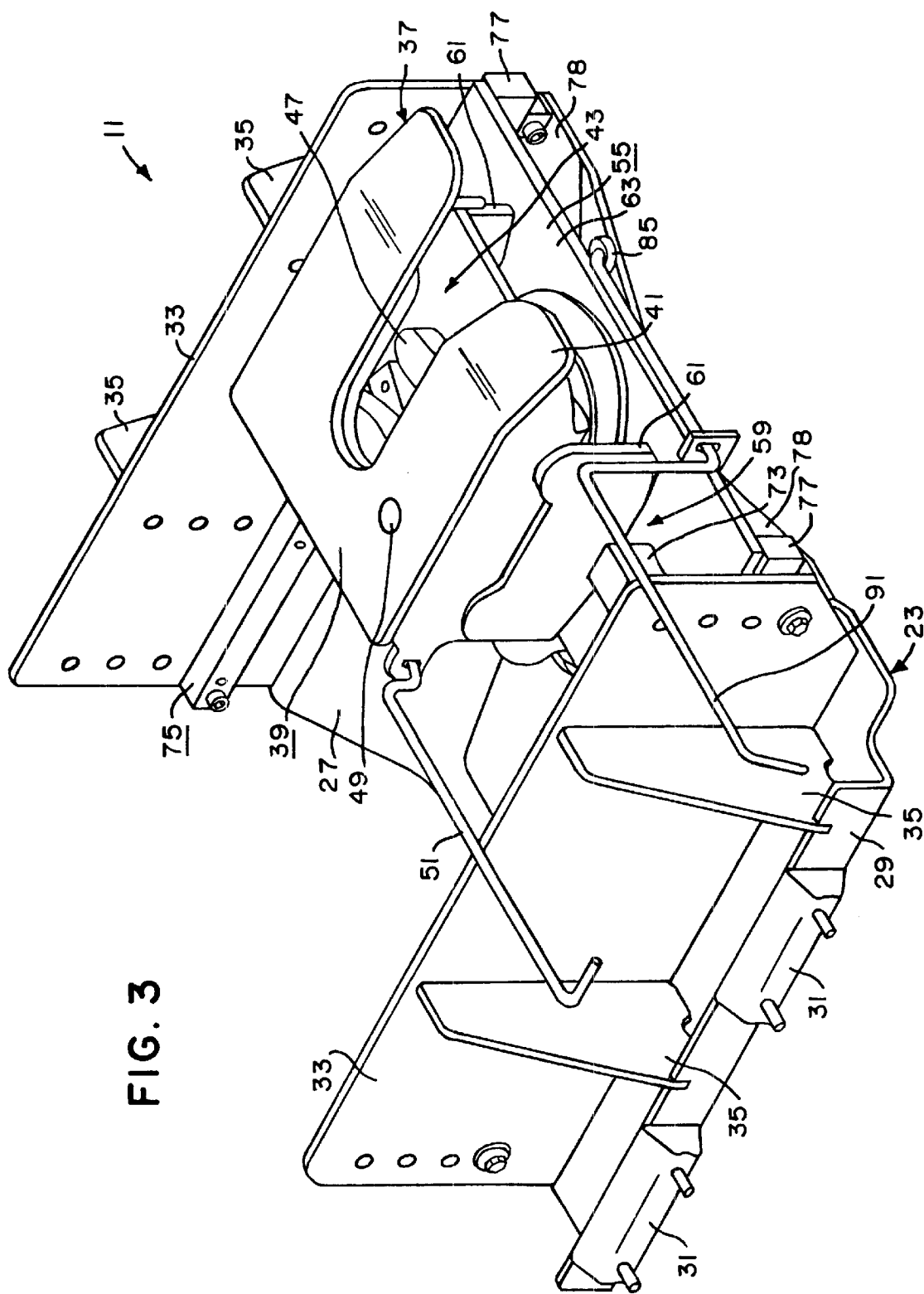
FIG. 3 is a perspective view of the combination hitch of the present invention with the superstructure thereof shown in a third position to allow enhanced maneuvering of a fifth wheel towed vehicle.
Figure 4:
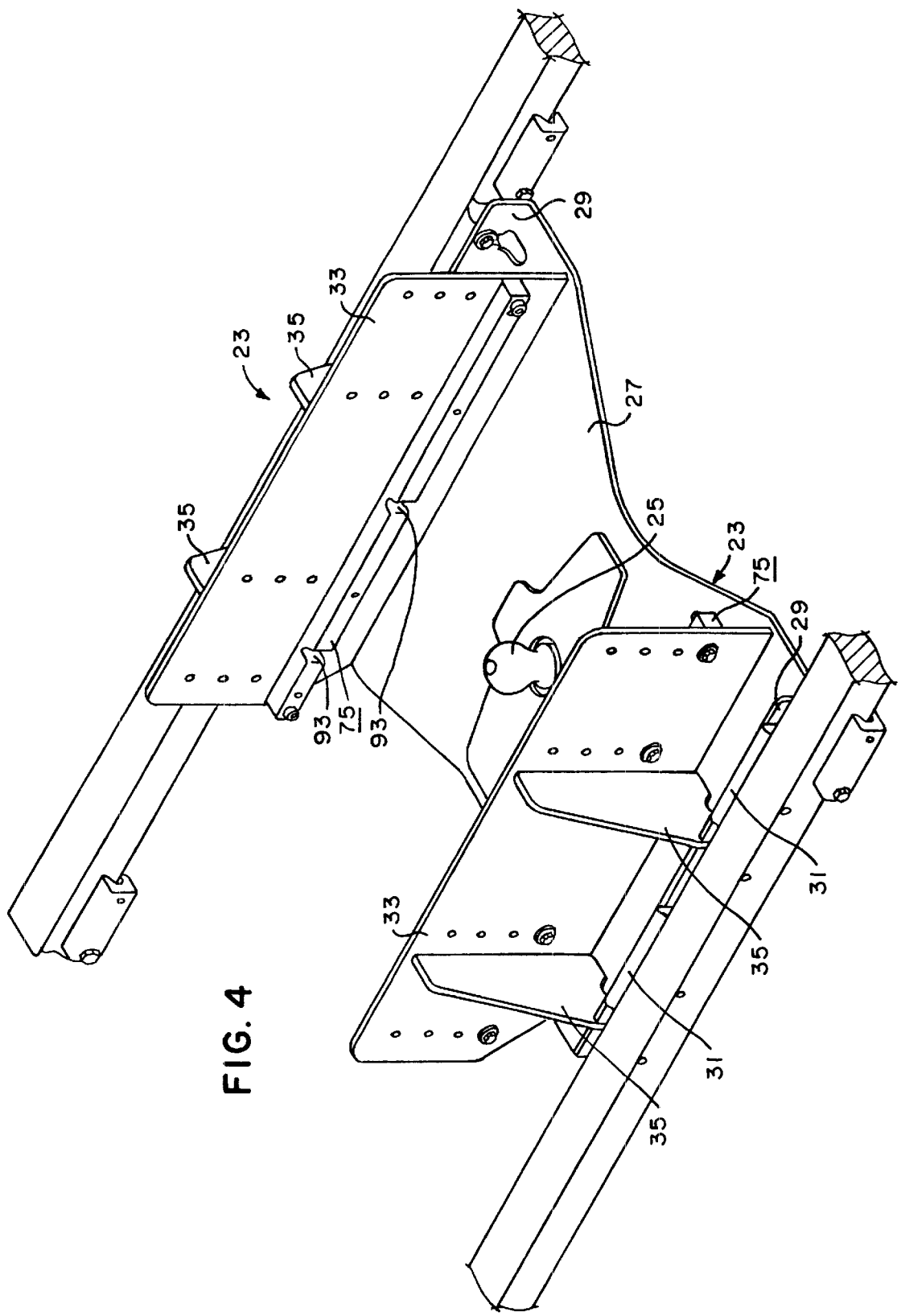
FIG. 4 is a perspective view of the base of the combination hitch of the present invention.
Figure 7:
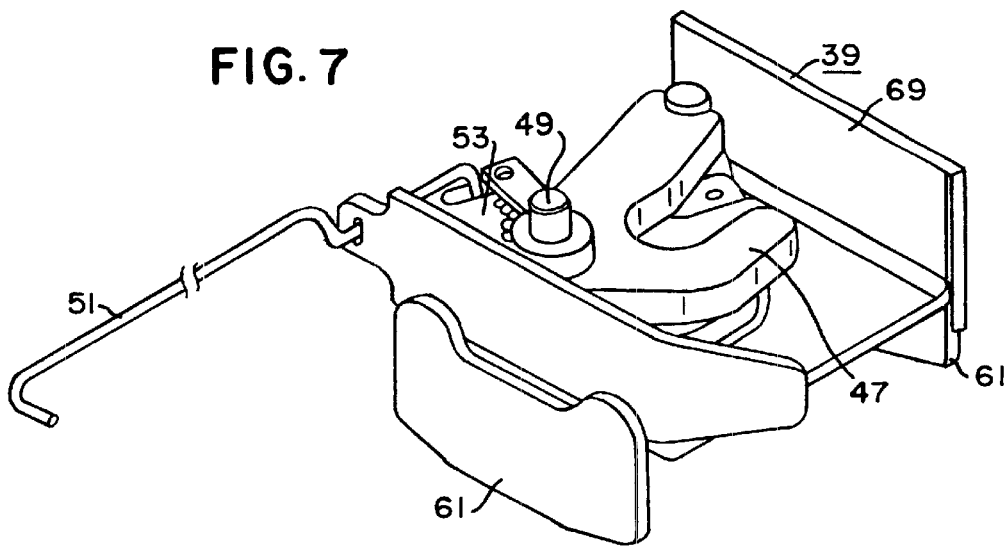
FIG. 7 is a top front perspective view of the pin box hitch member of the superstructure of the combination hitch of the present invention, with parts thereof (e.g., the yoke plate) removed for clarity and showing the retention plate thereof in a locked position.
Figure 8:
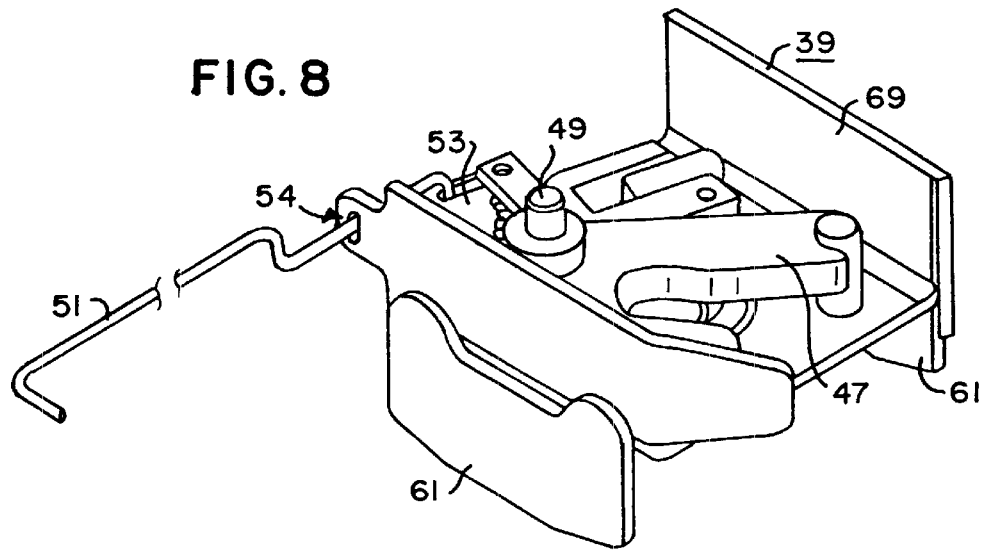
FIG. 8 is a top front perspective view of the pin box hitch member of the superstructure of the combination hitch of the present invention, with parts thereof (e.g., the yoke plate) removed for clarity and showing the retention plate thereof in an unlocked position.
Figure 9:
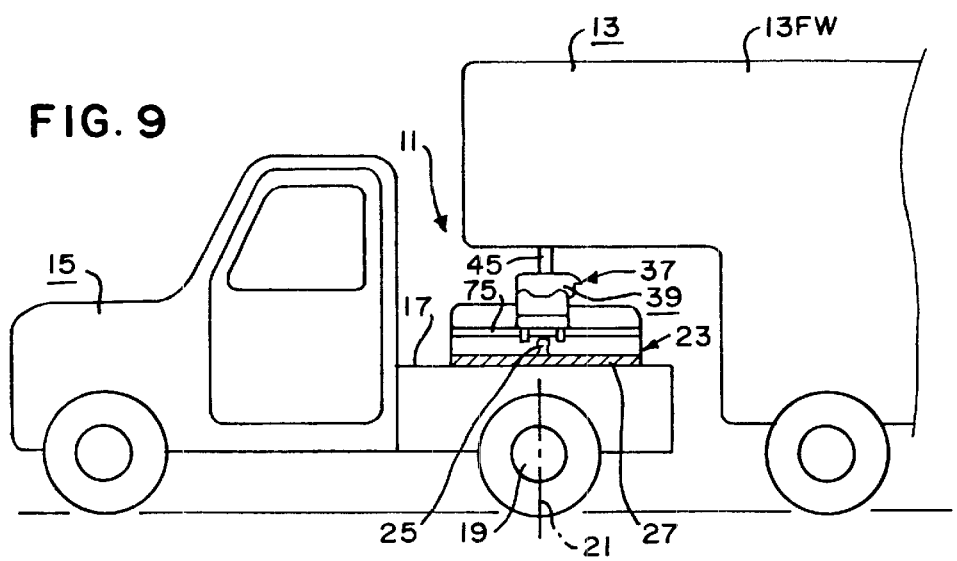
FIG. 9 is a somewhat diagrammatic side elevational view of the combination hitch of the present invention shown attached to the bed of a tow vehicle with the superstructure thereof in a first position and with a fifth wheel towed vehicle hitched thereto, with parts thereof broken away or removed for clarity.
Figure 10:
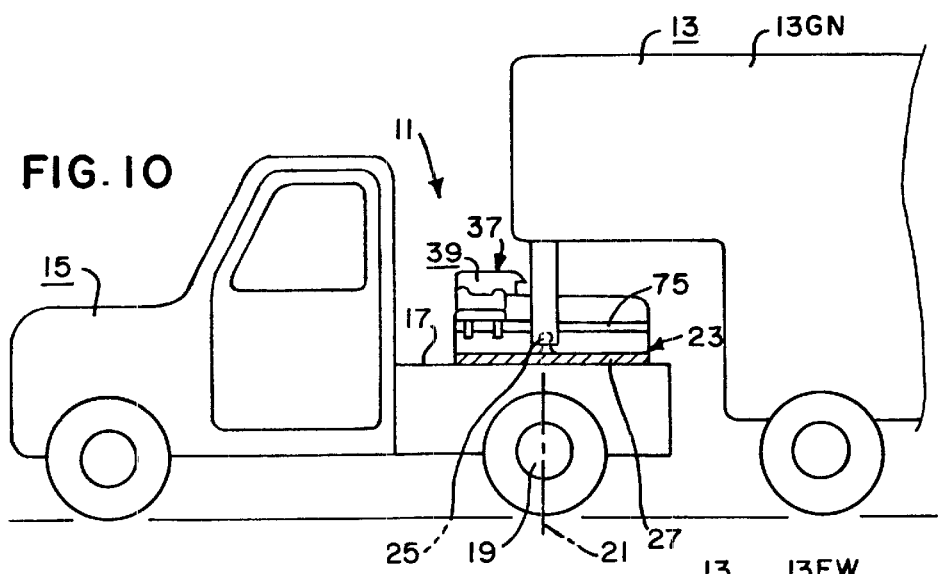
FIG. 10 is a somewhat diagrammatic side elevational view of the combination hitch of the present invention shown attached to the bed of a tow vehicle with the superstructure thereof in a second position and with a gooseneck towed vehicle hitched thereto, with parts thereof broken away or removed for clarity.
Figure 11:
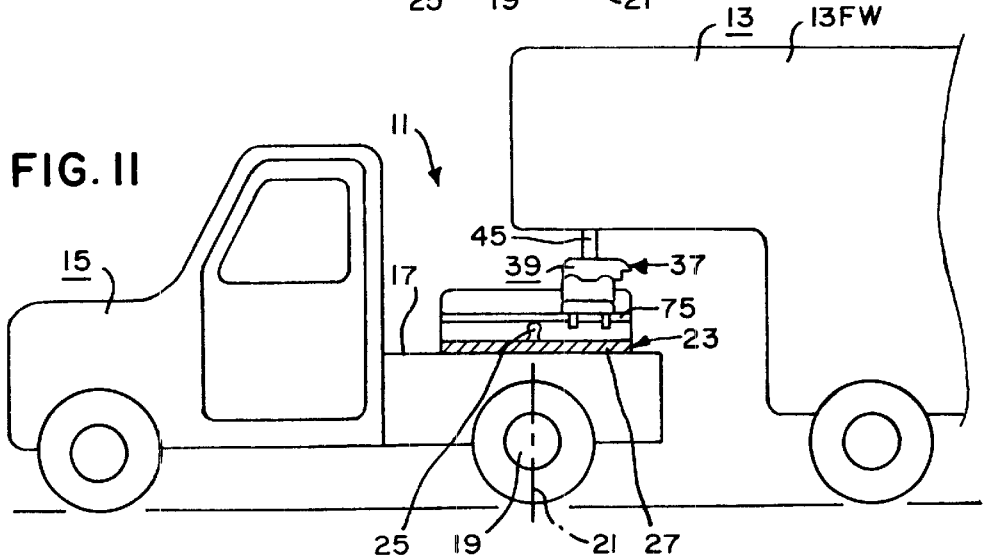
FIG. 11 is a somewhat diagrammatic side elevational view of the combination hitch of the present invention shown attached to the bed of a tow vehicle with the superstructure thereof in a third position and with a fifth wheel towed vehicle hitched thereto, with parts thereof broken away or removed for clarity.

The combination hitch 11 includes a superstructure 37 movable between a first position attached to the base 23 to allow towing of a fifth wheel towed vehicle 13FW (see, in general, FIG. 1), a second position attached to the base 23 to allow towing of a gooseneck towed vehicle 13GN (see, in general, FIG. 2), and, preferably, a third position attached to the base 23 third position to allow enhanced maneuvering of a fifth wheel towed vehicle 13FW (see, in general, FIG. 3). The superstructure 37 includes a pin box hitch member 39 for being located substantially directly over the ball hitch member 25 and the centerline 21 of the rear axle 19 of the tow vehicle 15 when the combination hitch 11 is attached to the bed 17 of the tow vehicle 15 when the superstructure 37 is in the first position. When the superstructure 37 is in the second position, the pin box hitch member 39 is located substantially forwardly of the ball hitch member 25 and the centerline 21 of the rear axle 19 of the tow vehicle 15 (toward the front of the tow vehicle 15). When the superstructure 37 is in the third position, the pin box hitch member 39 is located substantially rearward of the ball hitch member 25 and the centerline 21 of the rear axle 19 of the tow vehicle 15 (toward the rear of the tow vehicle 15).

The pin box hitch member 39, sometimes referred to merely as a pin box or fifth wheel hitch, preferably includes a generally U-shaped yoke or saddle plate 41 having a slot 43 for receiving the king pin 45 of a fifth wheel trailer 13FW, and a movable king pin retention plate 47 for coacting with the yoke plate 41 and movable between an unlocked or first position in which the king pin 45 can freely slide into and out of the slot 43 and a locked or second position in which the king pin 45 is captured and locked in the slot 43, thereby fastening the fifth wheel trailer 13FW to the combination hitch 11 and tow vehicle 15. The retention plate 47 is pivotably and rotatably attached to the yoke plate 41 by a pivot pin 49. A handle 51 is coupled to the retention plate 47 through a lock arm 53 so that a person can easily pivot the retention plate 47 between the first and second positions by merely moving the handle 51. The handle 51 may have a notch 54 or the like therein for coacting with wall structure of the pin box hitch member 39 to help hold the retention plate 47 in the first or unlocked position.

The superstructure 37 preferably includes a pin box carrier 55 positioned between the pin box hitch member 39 and the base 23, and a swivel bearing 57 joining the pin box hitch member 39 to the pin box carrier 55 to allow swivel movement of the pin box hitch member 39 on the pin box carrier 55. The swivel bearing 57 preferably allows a fore and aft tilting movement, a side to side tilting movement, and a rotational movement of the pin box hitch member 39 on the pin box carrier 55 to allow compensation for misalignment between the tow vehicle 15 and the towed vehicle 13 during fastening of the towed vehicle 13 to the combination hitch 11. For example, the swivel bearing 57 may be adapted to allow a fore and aft tilting movement of plus or minus 15°, a side to side tilting movement of plus or minus 3°, and a rotational movement of plus or minus 15°.

The superstructure 37 preferably includes limit means 59 for limiting the amount of swivel movement of the pin box hitch member 39 on the pin box carrier 55.

The actual construction of the superstructure 37, including the pin box hitch member 39, pin box carrier 55, swivel bearing 57, and limit means 59 may vary as will now be apparent to those skilled in the art. The pin box hitch member 39 preferably includes side plates 61 extending downwardly from opposite sides of the yoke plate 41 thereof. The pin box carrier 55 preferably includes a carrier or support plate member 63 for extending across the base 23, substantially completely from one side plate 33 to the other side plate 33. A stub shaft 65 is preferably mounted on top of the support plate 63 of the box carrier 55 to accept a spherical bearing 67. The pin box hitch member 39 preferably includes structure 69 joining the yoke plate 41 and side plates 61, and supporting the retention plate 47. A bearing housing 71 is preferably mounted on the underside of the structure 69 of the pin box hitch member 39 to house or capture the spherical bearing 67. The stub shaft 65, spherical bearing 67 and bearing housing 71 thus coact to form the swivel bearing 57 as will now be apparent to those skilled in the art.

A stop member or block 73 is preferably attached to opposite sides of the carrier plate member 63 for coacting with the side plates 61 of the pin box hitch member 39 to limit the amount of swivel movement of the pin box hitch member 39 on the pin box carrier 55 and, thus, form the limit means 59.

The superstructure 37 is preferably slidably mounted on the base 23. More specifically, an elongated slide bar 75 is preferably attached to the inside wall of each side plate 33 and a corresponding slider bar 77 is preferably mounted to the bottom of the opposite sides or ends of the carrier plate member 63 for engaging and sliding on a respective slide bar 75 to both support and allow slidable movement of the superstructure 37 on the base 23 as will now be apparent to those skilled in the art. Arm members 78 are preferably mounted to the bottom of the carrier plate member 63 for extending beneath the slide bars 75 to trap the slide bars 75 between the slider bars 77 and the ends of the arm members 78, thereby slidably securing the superstructure 37 to the base 23. The slide bars 75 are preferably bolted or otherwise adjustably attached to the side plates 33 and are adapted to be repositioned vertically to allow the height of the superstructure 37 to be varied to accommodate differences in heights of towed vehicles 13 and tow vehicles 15, etc., as will now be apparent to those skilled in the art.

The combination hitch 11 preferably includes lock means 79 for locking the superstructure 37 to the base 23 in one of the positions (e.g., in the first position to allow towing of a fifth wheel towed vehicle 13FW or in the third position to allow enhanced maneuvering of a fifth wheel towed vehicle 13FW). The lock means 79 preferably includes a tandem lock structure for locking opposite sides of the superstructure 37 to the base 23. More specifically, the lock means 79 preferably includes a first lock element or bar 81 located on one side of the superstructure 37 for movement between locked and unlocked positions, a second lock element or bar 83 located on the other side of the superstructure 37 for movement between locked and unlocked positions, a rotary member 85 located between the first and second lock elements 81, 83 for rotation between first and second positions, a first linkage 87 extending between the rotary member 85 and the first lock element 81 for causing the first lock element 81 to move between the locked and unlocked positions when the rotary member 85 is rotated between the first and second positions, a second linkage 89 extending between the rotary member 85 and the second lock element 83 for causing the second lock element 83 to move between the locked and unlocked positions when the rotary member 85 is rotated between the first and second positions, and a single pull handle 91 coupled to the rotary member 85 for rotating the rotary member 85 between the first and second positions.

Each slide bar 75 preferably has spaced retention slots 93 therein and the lock elements 81, 83 are adapted to engage a corresponding retention slot 93 when in the locked position to thereby lock the superstructure 37 to the base 23 in one of the positions. Each lock element 81, 83 is preferably pivotally mounted to the outer end of a respective stop member 73 by way of a pivot pin 95 or the like. Each linkage 87, 89 preferably includes a solid linkage rod 97, a rod end 99 for pivotally attaching one end of the corresponding linkage rod 97 to the rotary plate 85, and a ball joint 101 for movably attaching the other end of the linkage rod 97 to a corresponding lock element 81, 83. Such an arrangement provides the linkage rods 97 the freedom to move in all directions and axes at the same time. A spring (not shown) is preferably provided between each lock element 81, 83 and the corresponding stop member 73 to normally urge the lock elements 81, 83 to the locked positions, and the handle 91 is used to disengage the lock elements 81, 83 from the retention slots 93 (i.e., to unlock the superstructure 37 from the base 23) to allow the sliding action of the superstructure 37 on the base 23 to take place.

Grease fittings and the like may be provided for allowing various moving parts of the combination hitch 11 to be properly maintained, etc., as will now be apparent to those skilled in the art.

The operation of the combination hitch 11 of the present invention should now be apparent to those skilled in the art. With the base 23 properly positioned in the bed 17 of the tow vehicle 15 (e.g., with the ball hitch member 25 positioned directly over or just ahead of the centerline 21 of the rear axle 19 of the tow vehicle 15 and centered between the opposite sides of the bed 17) and properly attached to the bed 17 (e.g., bolted, welded or, preferably, using a rail system such as the mounting apparatus disclosed in King, U.S. Pat. No. 6,158,761), the superstructure 37 can easily be unlocked with a single pull of the handle 91, and slide to either of the three positions. When the superstructure 37 is slid to the desired position and the handle 91 is released, the lock elements 81, 83 will be urged to the locked positions within the respective retention slots 93, etc.

Although the present invention has been described and illustrated with respect to a preferred embodiment and a preferred use therefor, it is not to be so limited since modifications and changes can be made therein which are within the full intended scope of the invention.

What is claimed is:

1. A combination hitch for allowing a towed vehicle to be fastened to a tow vehicle, the tow vehicle including a bed and a rear axle having a centerline transversing the bed; said combination hitch comprising:

(a) a base for being attached to the bed of the tow vehicle, said base including a ball hitch member located substantially over the centerline of the rear axle of the tow vehicle; and (b) a superstructure movable from a first position attached to said base to a second position attached to said base, said superstructure including a pin box hitch member located substantially directly over said ball hitch member and the centerline of the rear axle of the tow vehicle when said superstructure is in said first position and not located substantially directly over said ball hitch member and the centerline of the rear axle of the tow vehicle when said superstructure is in said second position.

2. The combination hitch of claim 1 in which is included lock means for locking said superstructure to said base in said first position.

3. The combination hitch of claim 2 in which said lock means includes a single pull handle for unlocking said superstructure from said base.

4. The combination hitch of claim 2 in which said lock means includes a first lock element located on one side of said superstructure for movement between locked and unlocked positions, a second lock element located on the other side of said superstructure for movement between locked and unlocked positions, a rotary member located between said first and second lock elements for rotation between first and second positions, a first linkage extending between said rotary member and said first lock element for causing said first lock element to move between said locked and unlocked positions when said rotary member is rotated between said first and second positions, a second linkage extending between said rotary member and said second lock element for causing said second lock element to move between said locked and unlocked positions when said rotary member is rotated between said first and second positions, and a handle coupled to said rotary member for rotating said rotary member between said first and second positions.

5. The combination hitch of claim 1 in which said superstructure is movable to a third position attached to said base; in which said first position of said superstructure on said base allows optimum towability of a fifth wheel towed vehicle; in which said second position of said superstructure on said base allows optimum towability of a gooseneck towed vehicle; and in which said third position of said superstructure on said base allows optimum maneuverability of a fifth wheel towed vehicle.

6. The combination hitch of claim 1 in which said superstructure includes a pin box carrier positioned between said pin box hitch member and said base; and in which said superstructure includes a swivel bearing joining said pin box hitch member to said pin box carrier to allow swivel movement of said pin box hitch member on said pin box carrier.

7. The combination hitch of claim 6 in which said swivel movement of said pin box hitch member on said pin box carrier includes a fore and aft tilting movement, a side to side tilting movement, and a rotational movement to allow compensation for misalignment between the tow vehicle and the towed vehicle during fastening of the towed vehicle to said combination hitch.

8. The combination hitch of claim 7 in which said superstructure includes limit means for limiting the amount of swivel movement of said pin box hitch member on said pin box carrier.

* * * * *